United States Patent
Gieser et al.

(10) Patent No.: US 11,584,075 B2
(45) Date of Patent: Feb. 21, 2023

(54) SEAL SYSTEM

(71) Applicant: SLM SOLUTIONS GROUP AG, Luebeck (DE)

(72) Inventors: Eduard Gieser, Luebeck (DE); Christian Mueller, Luebeck (DE); Daniel Kopschinski, Luebeck (DE)

(73) Assignee: SLM Solutions Group AG

( * ) Notice: Subject to any disclaimer, the term of this patent is extended or adjusted under 35 U.S.C. 154(b) by 0 days.

(21) Appl. No.: 17/616,045

(22) PCT Filed: Jun. 8, 2020

(86) PCT No.: PCT/EP2020/065836
§ 371 (c)(1),
(2) Date: Dec. 2, 2021

(87) PCT Pub. No.: WO2020/259995
PCT Pub. Date: Dec. 30, 2020

(65) Prior Publication Data
US 2022/0193998 A1 Jun. 23, 2022

(30) Foreign Application Priority Data
Jun. 24, 2019 (DE) .................. 20 2019 103 479.3

(51) Int. Cl.
*B29C 67/00* (2017.01)
*B29C 64/245* (2017.01)
(Continued)

(52) U.S. Cl.
CPC ............ *B29C 64/245* (2017.08); *B22F 12/30* (2021.01); *B22F 12/38* (2021.01); *B29C 64/255* (2017.08); *B33Y 30/00* (2014.12); *F16J 15/40* (2013.01)

(58) Field of Classification Search
CPC ... B29C 64/357; B29C 64/245; B29C 64/255; B33Y 30/00; B22F 12/30; B22F 12/38; F16J 15/40
See application file for complete search history.

(56) References Cited

FOREIGN PATENT DOCUMENTS

| CN | 208303891 | 1/2019 |
|----|-----------|--------|
| DE | 10342882  | 5/2005 |

(Continued)

OTHER PUBLICATIONS

International Preliminary Examination Report for PCT/EP2020/065836, European Patent Office, dated Apr. 21, 2021.

(Continued)

*Primary Examiner* — Ryan M Ochylski
(74) *Attorney, Agent, or Firm* — Williams Mullen; Thomas F. Bergert

(57) ABSTRACT

The invention relates to a seal system (100, 200, 300) for an installation (400) for producing a three-dimensional workpiece by means of an additive layer manufacturing method, the seal system (100, 200, 300) comprising: a first seal (102), which is configured to seal an intermediate space (116) at a first periphery (108) between a process chamber inner wall (110) and a powder-material-supporting plate assembly (112) in a process chamber (410) of the installation (400); and a second seal (104), which is configured to seal the intermediate space (116) at a second periphery (114) between the process chamber inner wall (110) and the powder-material-supporting plate assembly (112) in the process chamber (410) of the installation (400), the first seal (102) being spaced apart from the second seal (104) such that, when the intermediate space (116) is sealed between the process chamber inner wall (110) and the plate assembly (112) by means of the first seal (102) and the second seal (Continued)

Figure 1:
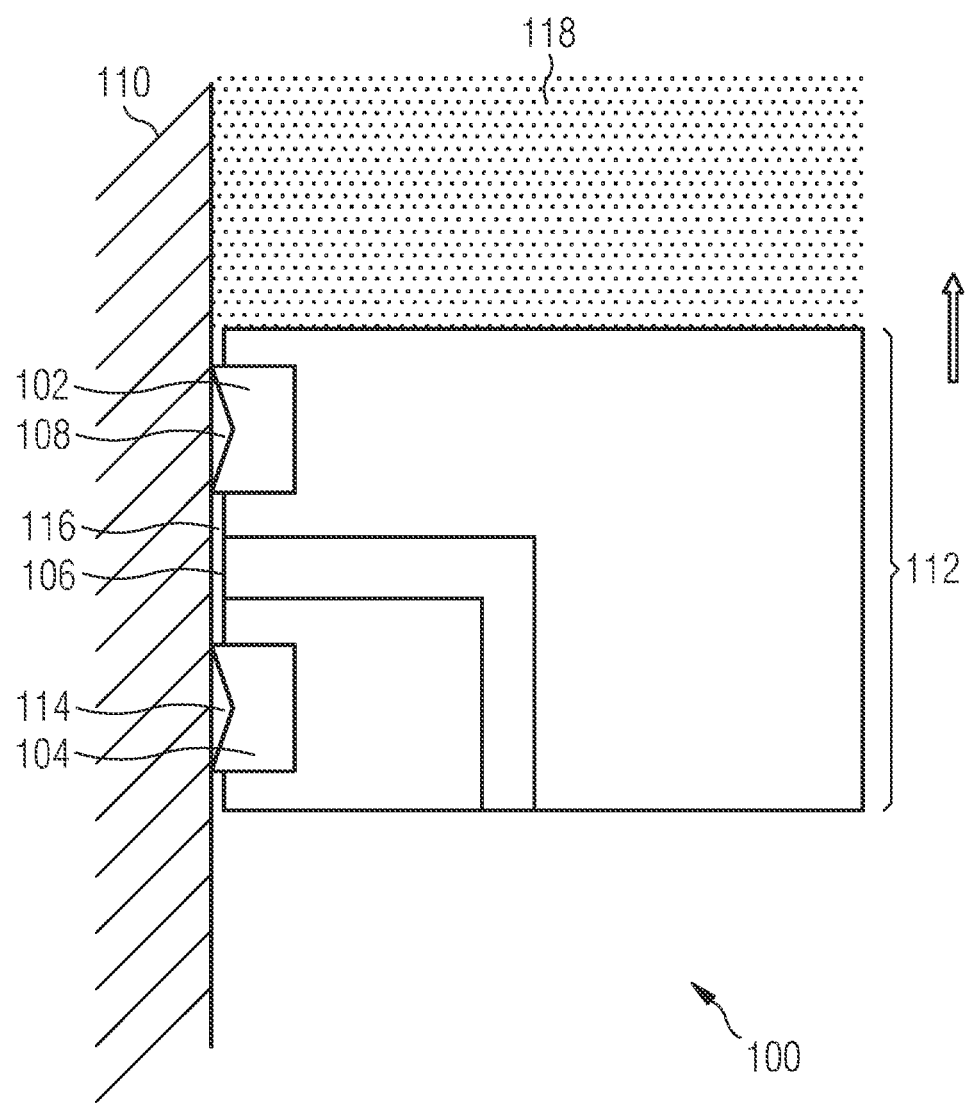

(104), a channel (106) is formed between the first seal (102) and the second seal (104) at an edge of the seal system (110).

16 Claims, 5 Drawing Sheets

(51) Int. Cl.
*B33Y 30/00* (2015.01)
*B29C 64/255* (2017.01)
*B22F 12/00* (2021.01)
*B22F 12/30* (2021.01)
*F16J 15/40* (2006.01)

(56) References Cited

FOREIGN PATENT DOCUMENTS

| | | |
|---|---|---|
| DE | 102011112581 | 3/2013 |
| DE | 102015211538 | 12/2016 |
| DE | 102016211214 | 12/2017 |
| DE | 102017118065 | 2/2019 |
| DE | 202019001440 | 4/2019 |
| DE | 102017125748 | 5/2019 |
| EP | 3023227 | 5/2016 |
| EP | 3275629 | 1/2018 |

OTHER PUBLICATIONS

International Search Report and Written Opinion for PCT/EP2020/065836, European Patent Office, dated Aug. 31, 2020.
Search Report for German Patent Application No. 20 2019 103 479.3, German Patent and Trademark Office, Oct. 22, 2019.

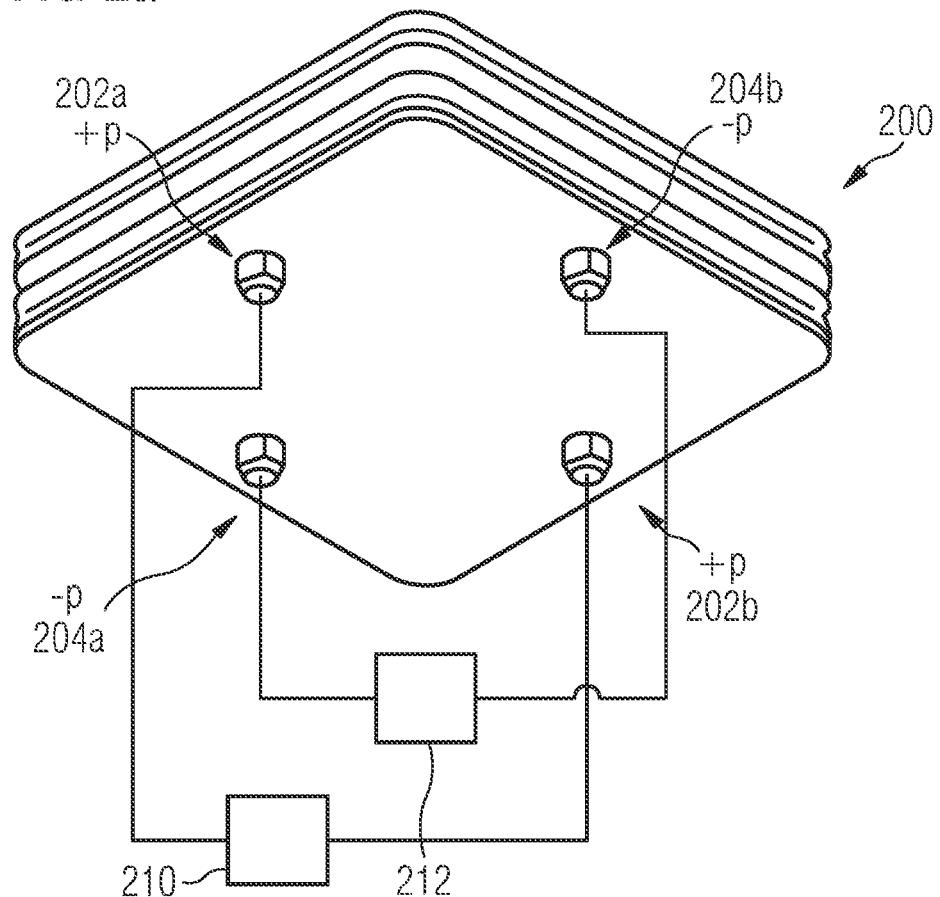
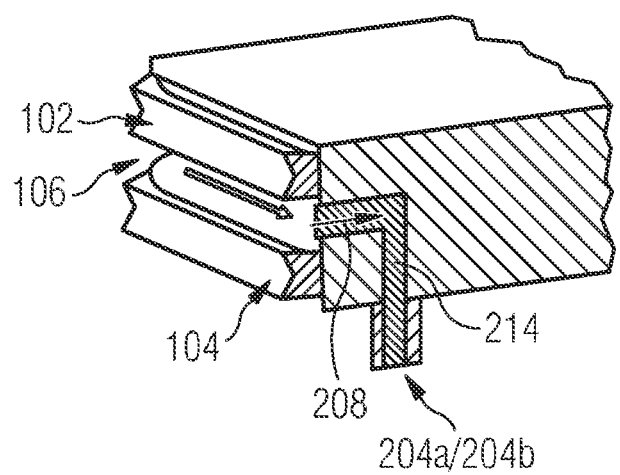

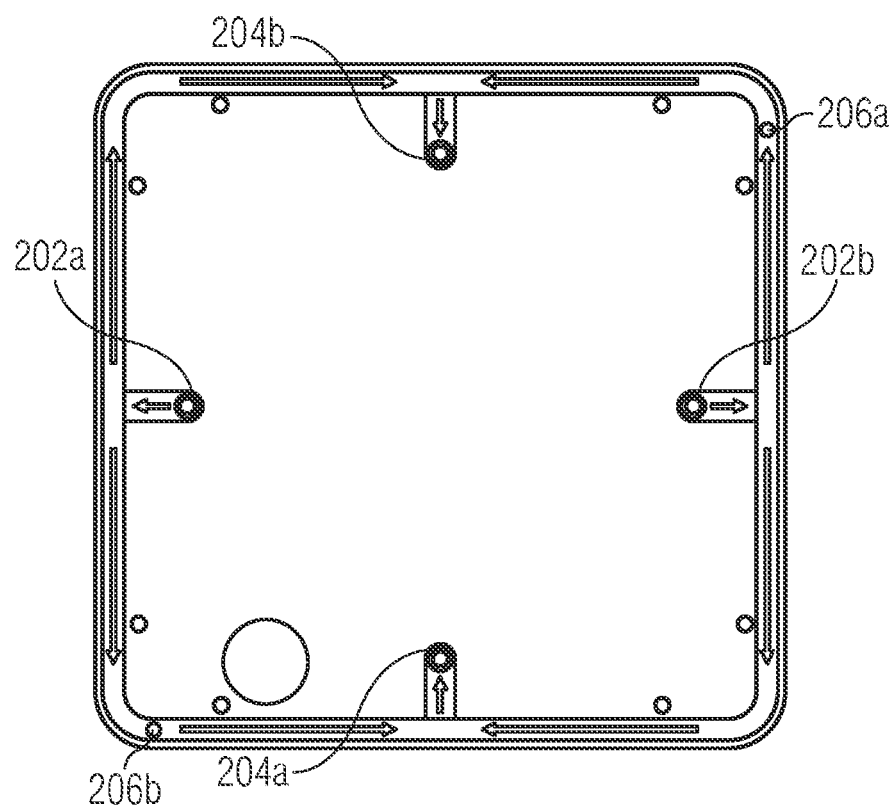

SEAL SYSTEM

CROSS-REFERENCE TO RELATED APPLICATIONS

This application is the U.S. national phase of international application PCT/EP2020/065836, filed on Jun. 8, 2020, which claims the benefit of German application DE 10 2019 103 479.3 filed on Jun. 24, 2019; all of which are hereby incorporated herein in their entirety by reference.

The invention relates to a seal system for an installation for producing a three-dimensional workpiece by means of an additive layer manufacturing method, a system comprising a seal system and a plate assembly coupled to the seal system that can be moved upwards and/or downwards, and an installation for producing a three-dimensional workpiece by means of an additive layer manufacturing method.

In additive layer manufacturing methods for producing three-dimensional workpieces, in particular in the method termed powder bed fusion, a raw material powder is applied in layers to a carrier and, depending on the desired geometry of the workpiece to be created, is acted upon site-selectively by electromagnetic radiation, for example laser radiation, or by particle radiation. The radiation penetrating the powder layer causes heating and consequently fusion or sintering of the raw material powder particles. Further raw material powder layers are then applied successively to the layer already treated with radiation on the carrier until the workpiece has the desired shape and size. The raw material powder can comprise ceramic, metal or plastic materials, or also material mixtures thereof. Additive layer manufacturing methods and in particular powder bed fusion methods can be used, for example, to produce prototypes, tools, spare parts or medical prostheses such as dental or orthopaedic prostheses, for example, and to repair components on the basis of CAD data.

One example of a device for producing three-dimensional workpieces by powder bed fusion is found in EP 3 023 227 B1. The device described in this document comprises a process chamber, in which a carrier and a powder application device for applying a raw material powder to the carrier are accommodated. The process chamber is provided with a powder inlet for supplying raw material powder to the powder application device and with a powder outlet for discharging excess raw material powder from the process chamber. A powder circulation line, in which a conveying device is arranged for conveying the raw material powder through the powder circulation line, connects the powder outlet of the process chamber to the powder inlet of the process chamber.

Installations for the production of three-dimensional workpieces by means of an additive layer manufacturing method and in particular by powder bed fusion normally have mechanical components that are moved accordingly. Increased wear of the moving components takes place due to the powder. Powder made of certain materials (such as metal or ceramic, for example) has abrasive properties. The adhesion of the powder to a wall and/or a seal can be relevant in this case for the abrasive properties. Powder is a form of bulk material. Bulk material other than powder can also have abrasive properties.

Seals between a plate assembly and a process chamber inner wall can experience wear at an early stage. In particular, during upward travel of a plate assembly of the installation on which the workpiece and surrounding powder is located in the process chamber, powder can be pulled underneath the seals, leading to rapid wear of the seals. As a consequence, powder can get through the seals into the environment of the installation and contaminate the room in which the installation is positioned.

The object of the invention is to provide a seal system that is suitable for use in an installation for producing a three-dimensional workpiece by means of an additive layer manufacturing method and which reduces wear of mechanical components in the installation in particular. Furthermore, the invention is based on the object of providing a seal system for an installation for producing a three-dimensional workpiece by means of an additive layer manufacturing method, which system permits cooling of certain components of the installation and in particular of the seal or seals and/or of a plate assembly of the installation, in order in particular to prolong their life. The invention is further based on the object of guaranteeing that the installation and/or the installation environment are kept dean and of ensuring occupational safety during use of the installation.

This object is achieved by a seal system with the features of claim 1, by a system with the features of claim 16 and by an installation with the features of claim 17.

A seal system for an installation for producing a three-dimensional workpiece by means of an additive layer manufacturing method is described, the seal system comprising a first seal, which is configured to seal an intermediate space at a first periphery between a process chamber inner wall and a plate assembly supporting powder material in a process chamber of the installation, and a second seal, which is configured to seal the intermediate space at a second periphery between the process chamber inner wall and the plate assembly supporting powder material in the process chamber of the installation, the first seal being spaced at a distance from the second seal in order to form a channel between the first seal and the second seal at an edge of the seal system upon sealing by the first seal and the second seal of the intermediate space between the process chamber inner wall and the plate assembly.

In some examples of the seal system, a seal (or both seals) is/are designed as a sealing lip.

One or both of the seals can comprise a gas-permeable seal material. This gas-permeable seal material is more robust against wear in some examples than gas-Impermeable seal material. One or both of the seals can be configured, for example, as felt seals and/or wipers. In some examples the upper seal is wear-optimised and the lower seal is (gas-) seal-optimised.

The seals can be circular, rectangular (for example, square) in shape or have another shape. The shape of a seal is adapted in this case in particular to the shape of the process chamber (i.e. the process chamber inner wall) and/or the inside of a build cylinder/a process chamber and/or the shape of the build platform.

The channel formed on sealing of the intermediate space between the process chamber inner wall and the plate assembly is limited by the first seal and the second seal. Furthermore, the channel is limited in some examples by the process chamber inner wall and the plate assembly.

The first seal is spaced at a distance from the second seal in a vertical direction with reference to the process chamber inner wall and the plate assembly, so that on sealing of the intermediate space between the process chamber inner wall and the plate assembly, the channel can be formed between the first seal and the second seal at an edge of the seal system.

The plate assembly can serve as a carrier for powder material. In some examples, the powder material carrier is mounted separately above or on the plate assembly.

Due to the formation of the channel between the first seal and the second seal at an edge of the seal system, integral extraction can take place of the powder, which can pass through the upper seal, in the seal area. The wear of the lower of the two seals can be slowed down by this in that powder passing through the upper seal can be extracted before it reaches the lower seal.

Furthermore, in the channel formed between the first seal and the second seal, a gas flow can be generated to cool the seals and/or the plate assembly and/or the lifting mechanism of the installation and/or other parts of the installation. A controlled temperature discharge can be achieved by the gas flow. By cooling the plate assembly, a heat emission of the plate assembly (in particular downwards) can be prevented or restricted. The life of the seals can be increased by cooling the seals.

In some examples of the seal system, the edge of the seal system comprises a circumferential edge of the seal system on which the channel is formed on sealing of the intermediate space. All powder material which passes from the carrier, which can be part of the plate assembly, through the upper seal into the channel can thus be extracted by extraction of the gas with powder material added to it.

In some examples, the seal system further comprises a gas supply source, which is coupled to the channel formed on sealing of the intermediate space and is configured to supply a gas to the channel to generate a gas flow in the channel. The gas flow in the channel can be controlled especially precisely by the gas supply source. In particular, the pressure in the channel can be increased or reduced as required by the gas supply source. In some examples, it can be prevented hereby that additional powder material, which is spread on the carrier or the plate assembly, is sucked into the channel, or that powder material is pressed from the channel into the upper part of the process chamber, in which the production of the three-dimensional workpiece takes place. Furthermore, the velocity of the gas flow in the channel can be controlled by the gas supply source in order to control the cooling of the seals and the plate assembly by the gas flow.

In some examples, the seal system also comprises gas extraction, which is coupled to the channel formed on sealing of the intermediate space and is configured to extract gas from the channel for generating a gas flow in the channel. The gas flow in the channel can be controlled especially precisely by the gas extraction. The pressure in the channel can further be adjusted by the gas extraction, so that it can be prevented that additional powder material, which is spread on the carrier or the plate assembly, is sucked into the channel, or that powder material in the channel is pressed into the upper part of the process chamber in the event of a pressure that is higher compared with a pressure in the upper part of the process chamber in which the production of the three-dimensional workpiece takes place. Furthermore, the velocity of the gas flow in the channel can be controlled by the gas extraction in order to control the cooling of the seals or of the plate assembly by the gas flow. Simultaneous control of the gas supply source and the gas extraction in particular permits precise control of the pressure in the channel and/or of the velocity of the gas flow in the channel.

In some examples, the seal system further comprises a powder circuit, which is coupled to the gas extraction and/or the gas supply source and is configured to return powder material, which is located in gas extracted by the gas extraction and/or in gas pressed by the gas supply source through the channel, to a powder depot of the installation. The powder material returned to the powder depot of the installation can thus be used for another process for producing the three-dimensional workpiece.

In some examples, the seal system is configured to generate the gas flow in the channel in the event of an upward movement of the plate assembly in the process chamber and/or during the production of the three-dimensional workpiece by means of the additive layer manufacturing method. In the event of an upward movement of the plate assembly in the process chamber in particular, powder material can be prevented from passing through the first seal to the second seal by generation of the gas flow. The seals and the plate assembly can additionally be cooled by the gas flow in the channel during production of the three-dimensional workpiece by means of the additive layer manufacturing method. In both processes the life of the moving or displaceable elements of the seal system and of the installation can be extended.

In some examples, the seal system further comprises one or more pressure sensors, which are configured to detect a pressure in the channel, the seal system being configured to reduce a pressure difference between the pressure in the channel and an ambient pressure, in particular a pressure in the process chamber. The pressure in the vicinity of the channel and in particular in the process chamber can be detected by one or more other pressure sensors at an appropriate position (for example, in the part of the process chamber in which the production of the three-dimensional workpiece takes place). The reduction in the pressure difference makes it possible for powder material from the part of the process chamber in which the production of the three-dimensional workpiece takes place not to be sucked into the channel and/or vice versa.

In some examples of the seal system, the gas supply source and/or the gas extraction are configured to reduce the pressure difference based on the pressure in the channel and the ambient pressure (for example, the pressure in the part of the process chamber in which the production of the three-dimensional workpiece takes place). The pressure in the channel can be controlled by control of the gas supply source and/or the gas extraction.

In some examples, the seal system is configured to generate a gas flow in the channel in a circumferential direction around the plate assembly. The gas flow direction in this case is parallel or substantially parallel to planes in which the seals lie. Powder material that passes through the upper seal into the channel can be carried along by the gas flow in the channel before it gets to the lower seal.

In some examples, the seal system is configured to generate a gas flow in the channel (substantially) perpendicular to the circumferential direction of the channel. The gas flow thus takes place (substantially) in a vertical direction between the two seals (i.e. substantially perpendicular to the planes in which the seals lie). Due to the vertical gas flow, a more uniform pressure profile can be obtained over the entire channel area. In some examples, the vertical gas flow can additionally be advantageous, as powder material that passes through the upper seal into the channel can be prevented from advancing to the lower seal and can be immediately carried away by the channel before deeper penetration into this.

In some examples, the seal system further comprises one or more excess pressure connections and one or more vacuum connections, which are arranged so that on formation of the channel, the excess pressure connections and the vacuum connections are coupled to the channel such that excess pressure connections and vacuum connections alternate in the channel direction. A gas flow can be generated hereby starting out from the excess pressure connection in both channel directions to a vacuum connection.

In some examples of the seal system, the excess pressure connections and the vacuum connections are coupled to the channel on formation of the channel such that distances in the channel direction from respectively successive connections of the excess pressure connections and vacuum connections are of equal length. A uniform gas flow can thus be accomplished over the entire channel length.

The excess pressure connections and vacuum connections in some examples are at the same distances from one another and accordingly have the same pressure distributions. In some examples, the excess pressure connections and vacuum connections are arranged at half the length of the plate assembly sides. In the case of a round or circular plate assembly, the excess pressure connections and vacuum connections in some examples are each arranged every 90°.

In some examples, the seal system further comprises one or more supply channels, by way of which the one or more excess pressure connections and/or the one or more vacuum connections are coupled to the channel formed on sealing of the intermediate space, a cross section of one of the supply channels narrowing before an entry into an area between the first seal and the second seal and/or the supply channel fanning out. The profile of the flow velocity of the gas flow over the circumferential direction can be kept as constant as possible hereby. Powder material located in the channel can thus be removed uniformly by the gas flow and returned to the powder depot of the installation. Due to a constant flow velocity of the gas flow over the circumferential direction, furthermore, the pressure can be kept constant over the circumferential direction. This makes it possible to prevent powder material from the upper part of the chamber, in which the production of the three-dimensional workpiece takes place, from being sucked or pressed into the channel by a local pressure difference of the pressure in the channel and the pressure in the upper part of the process chamber or from being sucked or pressed into the upper part of the process chamber.

In some examples, the seal system further comprises a processor, which is configured to calculate a gas flow in the channel by means of numerical flow simulation ("computational fluid dynamics") and to control a gas supply via the one or more excess pressure connections and/or a gas discharge via the one or more vacuum connections based on the calculated gas flow in the channel. The profile of the flow velocity over the circumferential direction can be kept as constant as possible hereby. The flow simulation is provided once in some examples to determine the optimal channel distribution for a given design with channels. Alternatively or in addition, the simulation takes place dynamically during the production of the three-dimensional workpiece.

In some examples of the seal system, the first seal comprises a more wear-resistant material than the second seal. The first seal can be the upper seal in particular in this case, which, although it is powder- and/or gas-permeable to a limited extent (or more powder- and/or gas-permeable than the second seal) in some examples, is more wear-resistant than the second seal. In some examples, the first seal is a felt seal or a wiper made of metal, ceramic, carbon, plastic, natural fibres or a combination of these, for example. In some examples the second seal comprises polytetrafluoroethylene (PTFE).

A system is also described for an installation for the production of a three-dimensional workpiece by means of an additive layer manufacturing method, the system comprising a seal system according to one of the examples described herein, and a plate assembly that is movable upwards and/or downwards and is coupled to the seal system. In some examples, the channel formed on sealing is formed inter alia by the first seal, the second seal and the movable plate assembly. The vertical position of the channel thus changes with the position of the movable plate assembly.

An Installation for the production of a three-dimensional workpiece by means of an additive layer manufacturing method is also described, the installation comprising: a system as described above; a process chamber, in which the system is arranged; a powder depot for supplying powder material to the process chamber for producing the three-dimensional workpiece from the powder material by means of the additive layer manufacturing method, the powder depot being coupled to the seal system in order to supply powder material extracted by the seal system to the powder depot; and an irradiation unit for irradiating a powder layer distributed on the plate assembly to produce the three-dimensional workpiece.

The installation can further comprise one or more sensors, which are configured to detect a pressure in the process chamber and/or in the environment of the installation. The pressure in the process chamber and/or in the environment of the installation can thus be compared by the installation with the pressure at one or more points in the channel, it being possible for the installation to adjust the pressure in the channel in order to reduce a pressure difference between the pressure in the process chamber and/or in the environment of the installation and the pressure at the one or more points in the channel. Alternatively or in addition to adjusting the pressure in the channel to reduce the pressure difference, the pressure in the process chamber and/or the pressure in the environment of the installation can also be controlled accordingly.

Figure 3A:
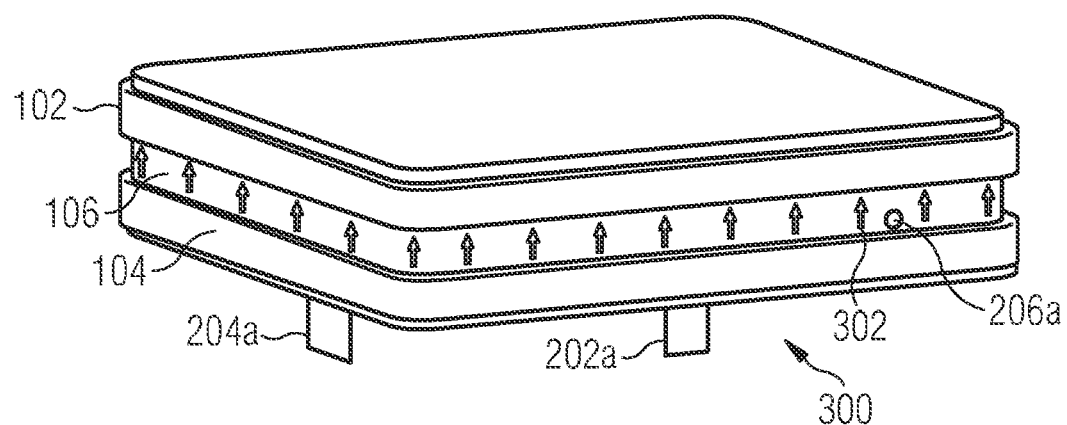
Figure 3B:
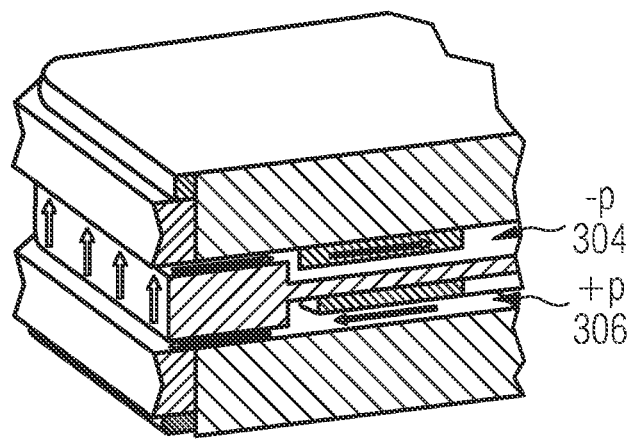
Figure 3C:
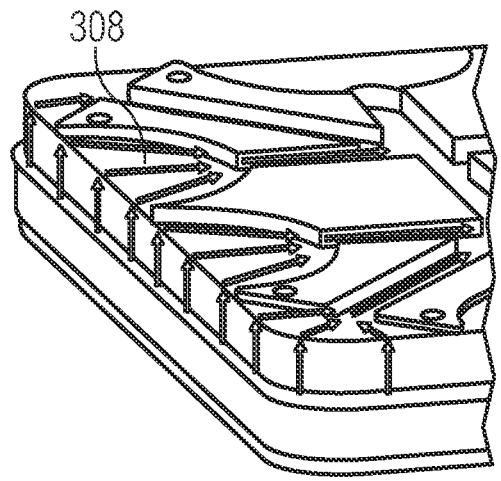
Figure 4:
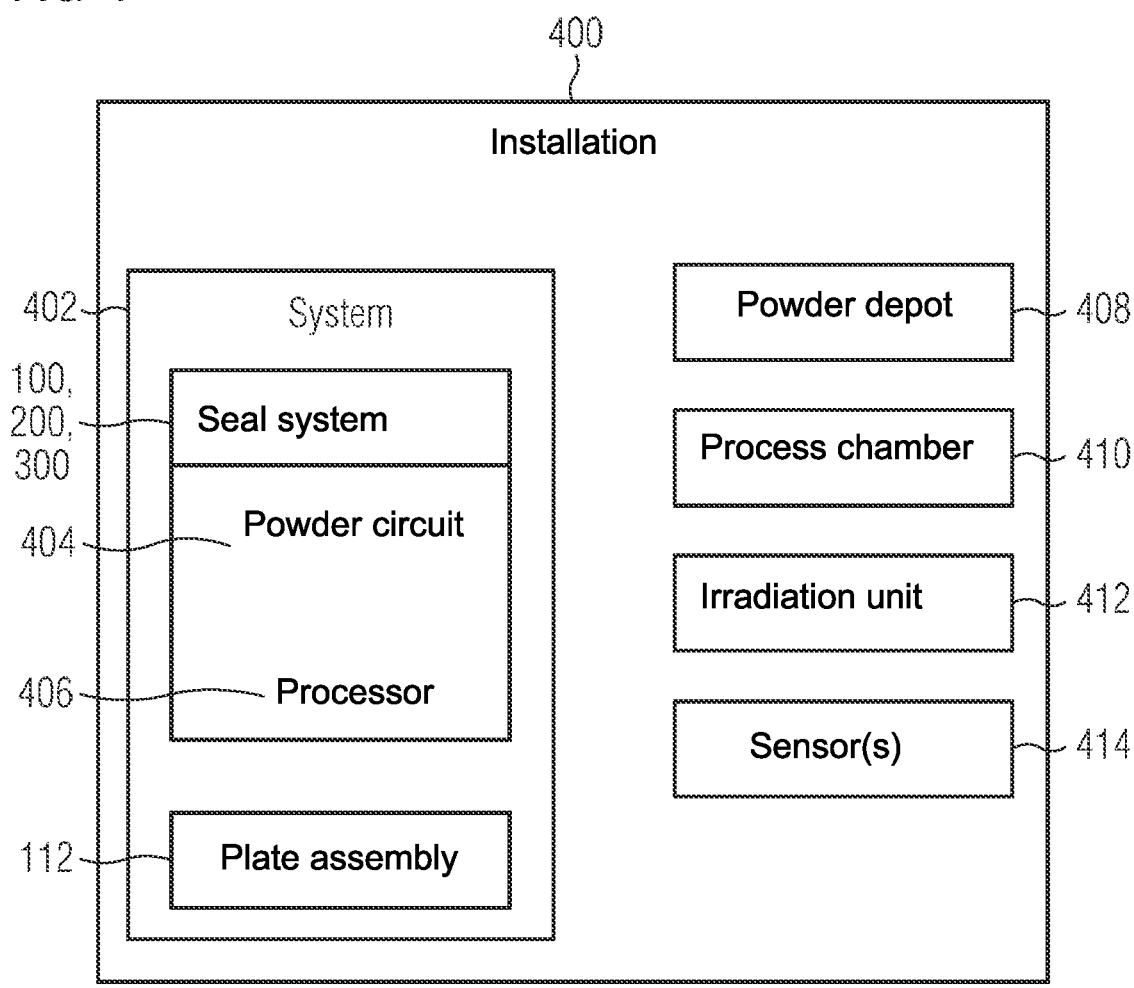

The invention is explained in greater detail below on the basis of the enclosed schematic figures, in which identical elements are provided with the same reference characters, and of which FIG. 1 shows a lateral view of a schematic drawing of a seal system for an installation for producing a three-dimensional workpiece by means of an additive layer manufacturing method in cross section;

FIGS. 2a to c show various views of a schematic drawing of a seal system for an installation for producing a three-dimensional workpiece by means of an additive layer manufacturing method;

FIGS. 3a to c show various views of a schematic drawing of another seal system for an installation for producing a three-dimensional workpiece by means of an additive layer manufacturing method; and FIG. 4 shows a schematic block diagram of an installation for producing a three-dimensional workpiece by means of an additive layer manufacturing method.

The present invention relates in particular to build cylinder seal extraction.

The seals between a plate package (plate assembly) and the build cylinder wall (process chamber wall) can wear at a relatively early stage.

During an unpacking process in particular, depending on the machine structure, the plate assembly plus component and surrounding powder in the process chamber are moved upwards. Powder can be drawn under the sealing lips (or seal(s) in general) in this case, which can lead to rapid wear of the plate package seals. In consequence, powder can pass through the seal(s) into the environment and contaminate the machine interior.

FIG. 1 shows a lateral view of a schematic drawing of a seal system 100 for an installation for producing a three-dimensional workpiece by means of an additive layer manufacturing method in cross section.

In this example, the seal system 100 comprises a first seal 102 and a second seal 104, the first seal 102 being spaced at a distance from the second seal 104. The first seal 102 is formed on a first periphery 108 between a process chamber inner wall 110 and a plate assembly 112. The second seal 104 is formed on a second periphery 114 between the process chamber inner wall 110 and the plate assembly 112. An intermediate space 116 between the process chamber inner wall 110 and the plate assembly 112 is thus sealed by the first seal 102 and the second seal 104.

A channel 106 is thus formed between the process chamber inner wall 110, the plate assembly 112, the first seal 102 and the second seal 104.

Powder material 118 is located on the plate assembly 112 in this example. In some examples, a separate carrier is mounted on the plate assembly 112, which can receive the powder material 118.

Extraction of the powder integrated in the seal area can slow down the wear of the second (lower) seal 104 of the two plate assembly seals on the one hand in that powder material 118 passing through the first (upper) seal 102 is extracted before it reaches the second seal. Furthermore, due to the extraction of the powder integrated in the seal area, powder passing through the first seal 102 can be conveyed back into the powder circuit so that it cannot contaminate the machine interior.

Located between the seals of the plate package is at least one channel, through which a gas flows, which carries the powder passing through the upper seal along with it and returns it to the powder circuit of the installation.

The pressure and/or the pressure gradient in the channel can be monitored by means of one or more pressure transducers (pressure sensors) and maintained at values close to the ambient pressure, so that any load on the seals due to a pressure difference can be kept as small as possible. It can also be ensured that no powder is aspirated through the seal gap thereby or that gas is pressed through the seal into the powder 118.

The through-flow can either be activated only during the upward movement of the plate package, as this can be the most critical operating state for the seals and in particular powder can pass through the seals here. In addition or alternatively to this, the through-flow can be activated during the build job, i.e. during the production of the three-dimensional workpiece. The gas flow can serve in this case additionally to cool the seals and/or the plate package, which may contribute to extending the life of the plate package components.

FIGS. 2a to c show various views of a schematic drawing of a seal system 200 for an installation for producing a three-dimensional workpiece by means of an additive layer manufacturing method.

FIG. 2a shows a schematic drawing of the seal system 200 in a perspective view.

In this example, the seal system comprises, in addition to the first seal and the second seal, two excess pressure connections 202a and 202b. The excess pressure connections 202a and 202b are coupled in this example to a gas supply source 210 in order to introduce gas through the gas supply source 210 via the excess pressure connections 202a and 202b Into the channel to generate a gas flow in the channel.

In this example, the seal system additionally comprises two vacuum connections 204a and 204b. The vacuum connections 204a and 204b are coupled in this example to a gas extraction facility 212 to extract gas from the channel through the gas extraction facility 212 via the vacuum connections 204a and 204b, whereby a gas flow is generated in the channel.

In the examples described herein, only one or more excess pressure connections, or one or more vacuum connections, can be used alternatively.

FIG. 2b shows a schematic drawing of the seal system 200 in a perspective view partly in cross section.

In this example, a gas flow 208 is generated along the channel 106 and extracted via a supply channel 214 through a vacuum connection. The connection can also serve for an excess pressure connection.

FIG. 2c shows a view of a schematic drawing of the seal system 200 from underneath in cross section.

In this example, pressure sensors 206a and 206b are mounted laterally on the plate assembly to be able to measure the pressure in the channel 106 at suitable points.

As can be seen from FIGS. 2a to c, the gas flows in this example through a channel in a circumferential direction around the plate package. Any powder passing through the upper seal would have to pass this channel before it reaches the lower seal and can be carried along by the gas flow in the channel and returned to the powder circuit of the machine. Located on the underside of the plate package in this example are two pressure connections (+p) and two suction connections (−p), each preferably at half the length of the plate package sides. These are connected directly to the channel (groove) running around the entire plate package between the seals. In the case of a circular plate package, the pressure/suction connections can be arranged every 90°, for example.

FIGS. 3a to c show various views of a schematic drawing of another seal system 300 for an installation for producing a three-dimensional workpiece by means of an additive layer manufacturing method.

FIG. 3a shows a schematic drawing of the seal system 300 in a perspective view.

In this example, a gas flow 302 is generated, which flows from the lower seal in the channel substantially perpendicular to the plate assembly to the upper seal.

FIG. 3b shows a schematic drawing of the seal system 300 in a perspective view partly in cross section.

In this example, the gas flows via an excess pressure connection through a supply channel 306 in the direction of the channel 106. After the gas has flowed from the lower seal through the channel 106 substantially perpendicular to the plate assembly to the upper seal, it is extracted through a vacuum connection via the supply channel 304.

FIG. 3c shows a schematic drawing of the seal system 300 in a perspective view partly in cross section.

A cross section of the supply channels 308 changes with the gas flow direction in order to keep the profile of the flow velocity as constant as possible.

In this example, the gas flows in a vertical direction within the area between the seals, either from top to bottom or from bottom to top. The supply and discharge channels are optimised such that the profile of the flow velocity is as constant as possible over the circumferential direction. This can be achieved in that the in/outflow cross sections narrow and/or fan out before entry into the area between the seals. Optimisation of the gas flow is achieved in some cases by computational fluid dynamics (CFD) calculations.

Let reference be made to the fact that in some examples, a gas flow taking place substantially perpendicular to the plate assembly can be generated alternatively or in addition in the seal system of FIG. 2, as is shown in FIG. 3. Furthermore, in some examples, a gas flow taking place parallel to (i.e. along) the channel longitudinal direction can be produced alternatively or in addition in the seal system of FIG. 3, as shown in FIG. 2. Corresponding supply and discharge channels of the seal system of FIG. 3 can be used for this in the seal system of FIG. 2 and vice versa.

The upper seal in some examples is a seal that, although powder- and/or gas-permeable to a limited extent from the start, is more wear-resistant than the lower seal, which can be a PTFE lip seal, for example. The upper seal in some examples is a felt seal or a wiper made of metal, ceramic, carbon, plastic, natural fibres or a combination hereof.

The number of seals and the number of channels between the seals can vary between different examples of the seal system. Three or more seals with consequently two or more formed channels can advantageously lead to seals lying further down wearing more slowly and in particular it being possible to substantially prevent wear due to powder for the seal lying furthest underneath.

The number of pressure and suction connections and/or channels can be greater or smaller than indicated in the examples described above.

The position of the pressure and suction channels and connection points between annular channel and pressure/suction connections can vary between different examples over the circumference of the plate package (e.g. not at half the length of the plate package sides, but instead in the radii of the plate package).

FIG. 4 shows a schematic block diagram of an installation 400 for producing a three-dimensional workpiece by means of an additive layer manufacturing method.

In this example the installation comprises a system 402, which comprises a seal system (100, 200, 300) and a plate assembly 112.

The seal system in this example comprises a powder circuit 404 and a processor 406.

The powder circuit 404 in this example is coupled to a powder depot 408 of the installation 400, so that powder material that is extracted by the seal system from the channel can be returned via the powder circuit 404 to the powder depot 408.

The processor 406 calculates gas flows in the channel and in the supply and/or discharge channels to the channel, the installation 400 and the seal system being configured to optimise the gas flows by CFD calculations (before the start of production of the three-dimensional workpiece and/or during production of the three-dimensional workpiece) and in particular to keep the profile of the flow velocity as constant as possible over the circumferential direction of the channel. The processor 406 enables the gas flows in the channel and in the supply and/or discharge channels to the channel to be harmonised with the pressure behaviour in the process chamber.

In this example the installation 400 further comprises a process chamber 410, which is coupled to the powder depot 408. The system 402 is arranged in the process chamber 410.

The installation 400 further comprises in this example an irradiation unit 412 for irradiating a powder layer on the plate assembly 112 or on a carrier, which is arranged above the plate assembly 112 in the process chamber 410. Powder material can be solidified hereby to produce a layer of the three-dimensional workpiece to be produced.

In this example, the installation 400 further comprises one or more sensors 414. In some examples, these are arranged on the process chamber inner wall of the process chamber 410 in order to determine a pressure in the part of the process chamber 410 in which the three-dimensional workpiece is produced. In addition or alternatively to this, one or more sensors can be arranged on an outer side of the process chamber or the installation to determine an ambient pressure of an environment of the channel, which makes it possible to reduce a pressure difference between a pressure in the channel and the ambient pressure.

The life of the plate package sealing (i.e. seals and/or plate assembly) in particular can be extended by the examples of the seal system and system described herein and the installation described herein. In particular, a lower seal is relieved and can thus perform better over a longer period. It can be prevented that powder enters the machine interior, the powder being able to be returned instead to the powder circuit.

The invention claimed is:

1. Seal system for an installation for producing a three-dimensional workpiece by means of an additive layer manufacturing method, the seal system comprising:
a first seal, which is configured to seal an intermediate space on a first periphery between a process chamber inner wall and a plate assembly supporting powder material in a process chamber of the installation, and
a second seal, which is configured to seal the intermediate space on a second periphery between the process chamber inner wall and the plate assembly supporting powder material in the process chamber of the installation,
the first seal and the second seal being mounted on the plate assembly and the first seal being spaced at a distance from the second seal in order to form, on sealing by the first seal and the second seal of the intermediate space between the process chamber inner wall and the plate assembly, a channel between the first seal and the second seal at an edge of the seal system for a gas to flow (i) along the channel in a circumferential direction around the plate assembly and/or (ii) substantially perpendicular to the circumferential direction of the channel.

2. Seal system according to claim 1, the edge of the seal system comprising a circumferential edge of the seal system on which the channel is formed on sealing of the intermediate space.

3. Seal system according to claim 1, further comprising a gas supply source, which is coupled to the channel formed on sealing of the intermediate space and is configured to supply a gas to the channel for generating a gas flow in the channel.

4. Seal system according to claim 1, further comprising a gas extraction facility, which is coupled to the channel formed on sealing of the intermediate space and is configured to extract a gas from the channel for generating a gas flow in the channel.

5. Seal system according to claim 4, further comprising a powder circuit, which is coupled to the gas extraction facility and/or the gas supply source and is configured to return powder material, which is located in the gas extracted by the gas extraction facility and/or in the gas pressed through the channel by the gas supply source, to a powder depot of the installation.

6. Seal system according to claim 3, wherein the gas supply source is configured to generate the gas flow in the channel in the event of an upward movement of the plate assembly in the process chamber and/or during the production of the three-dimensional workpiece by means of the additive layer manufacturing method.

7. Seal system according to claim 1, further comprising one or more pressure sensors, which are configured to detect a pressure in the channel, the seal system being configured to reduce a pressure difference between the pressure in the channel and an ambient pressure, in particular a pressure in the process chamber.

8. Seal system according to claim 7, further comprising one or both of a gas supply source and a gas extraction facility, which are coupled to the channel formed on sealing of the intermediate space and configured to supply and/or extract a gas to/from the channel for generating a gas flow in the channel, the gas supply source and/or the gas extraction facility being configured to reduce the pressure difference based on the pressure in the channel and the ambient pressure.

9. Seal system according to claim 1, further comprising one or more excess pressure connections and one or more vacuum connections, which are arranged such that on formation of the channel, the excess pressure connections and the vacuum connections are coupled to the channel such that excess pressure connections and vacuum connections alternate in the channel direction.

10. Seal system according to claim 9, the excess pressure connections and the vacuum connections being coupled on formation of the channel to the channel such that spacings of respectively consecutive connections of the excess pressure connections and vacuum connections in the channel direction are of equal length.

11. Seal system according to claim 9, further comprising one or more supply channels via which the one or more excess pressure connections and/or the one or more vacuum connections are coupled to the channel-formed on sealing of the intermediate space, a cross section of one of the supply channels narrowing before entry into an area between the first seal and the second seal and/or the supply channel fanning out.

12. Seal system according to claim 11, further comprising a processor, which is configured to adjust a gas flow in the channel by means of the pressure sensors such that the pressure differences between channel and process chamber are minimised.

13. Seal system according to claim 1, the first seal comprising a more wear-resistant material than the second seal.

14. Seal system according to claim 1,
wherein the plate assembly is movable upwards and/or downwards.

15. Installation for producing a three-dimensional workpiece by means of an additive layer manufacturing method, the installation comprising:
a system according to claim 14;
a process chamber, in which the system is arranged;
a powder depot for supplying powder material to the process chamber for producing the three-dimensional workpiece from the powder material by means of the additive layer manufacturing method, the powder depot being coupled to the seal system in order to supply powder material extracted by the seal system to the powder depot; and
an irradiation unit for irradiating a powder layer distributed on the plate assembly to produce the three-dimensional workpiece.

16. Installation according to claim 15, further comprising one or more sensors, which are configured to detect a pressure in the process chamber and/or in the environment of the installation.

* * * * *